United States Patent [19]
Mishina et al.

[11] Patent Number: 5,358,166
[45] Date of Patent: Oct. 25, 1994

[54] REFLOW SOLDERING APPARATUS

[75] Inventors: Haruo Mishina, Ushiku; Masato Itagaki, Kashiwa, both of Japan

[73] Assignee: Hitachi Techno Engineering Co. Ltd., Tokyo, Japan

[21] Appl. No.: 43,908

[22] Filed: Apr. 7, 1993

[30] Foreign Application Priority Data

Apr. 16, 1992 [JP] Japan .................. 4-095707

[51] Int. Cl.⁵ .................. B23K 1/012; H05K 3/34
[52] U.S. Cl. .................. 228/42; 228/232; 228/234.1; 228/49.5; 432/152
[58] Field of Search .......... 228/42, 47, 20.1, 180.2, 228/219, 232, 234.1

[56] References Cited

U.S. PATENT DOCUMENTS

| | | | |
|---|---|---|---|
| 5,154,338 | 10/1992 | Okuno et al. | 228/42 |
| 5,163,599 | 11/1992 | Mishina et al. | 228/232 |

FOREIGN PATENT DOCUMENTS

| | | | |
|---|---|---|---|
| 64-171571 | 3/1989 | Japan | 228/48 |
| 1-148459 | 6/1989 | Japan | 228/47 |
| 1-262069 | 10/1989 | Japan | 228/47 |
| 3-77773 | 4/1991 | Japan | 228/42 |

OTHER PUBLICATIONS

Patent Abstracts of Japan, ABS GRP NO:M841, vol. 13, No. 274, ABS Pub Date, Jun. 23, 1989.

*Primary Examiner*—Samuel M. Heinrich
*Attorney, Agent, or Firm*—Antonelli, Terry, Stout & Kraus

[57] ABSTRACT

A reflow soldering apparatus comprises a preheating chamber and a reflow chamber, both of which are furnished with a plurality of means for circulating a hot gas being composed of a cross flow blower, a divergent nozzle, a heater, a temperature sensor, a temperature controller, and a power regulator etc. The cross-flow blowers above a conveyer are arranged in a back to back manner and the blowers beneath the conveyer are arranged in a face to face manner, and soldering is performed by impinging the hot gas upon a circuit substrate being transferred by the conveyer.

A reflow soldering apparatus having a small temperature fluctuation in the preheating chamber and the reflow chamber, high reliability in the soldering by maintaining a desired temperature profile, and preferable economy is provided.

11 Claims, 8 Drawing Sheets

REFLOW SOLDERING APPARATUS

BACKGROUND OF THE INVENTION (1) Field of the Invention

The present invention relates to a reflow soldering apparatus for soldering electronic members to a circuit substrate with a hot gas (which is obtained by heating) of various gases, especially, to the economical reflow soldering apparatus having a small temperature fluctuation at a pre-heating chamber and a reflow chamber for main heating, an ability to maintain a desired temperature profile, and a preferable solderability.

(2) Description of the Prior Art

Currently, technology for high density packaging and surface mounting of a substrate have progressed, and a reflow soldering method is widely adopted for soldering electronic members to a circuit substrate in view of reliability and productivity of the soldering. Furthermore, solder particles in soldering paste are becoming finer than ever and solid substances in soldering flux are becoming less than ever.

With the soldering paste changing in accordance with the above described tendency, conventional soldering of the circuit substrate by the reflow soldering method with hot air frequently causes solder balls and a lack of wettability on account of oxidation of the solder particles and insufficiency of an activating agent.

Therefore, the reflow soldering method using an inert hot gas such as nitrogen instead of air has become widely adopted. For example, JP-A-64-71571 (1989) discloses a representative reflow apparatus for the above described reflow soldering method. FIG. 8 is a schematic vertical cross section illustrating a composition of the conventional reflow soldering apparatus which is disclosed in the above example, JP-A-64-71571 (1989).

Referring to FIG. 8, the reflow soldering apparatus comprises three units for a preheating zone (a preheating chamber), two units for a main heating zone (a reflow chamber), and two units for a cooling zone (a cooling chamber).

As for a heater, a gas blow type infrared heater 54 is adopted for all of the chambers, and a pair of the heaters is provided at above and beneath a processing objects conveyer (not shown), respectively. Nozzles 55 which are adjustable in a gas blow out direction are provided respectively among each of the infrared heaters 54 in a manner making a pair by above and beneath the conveyer. The gas for heating is supplied to each of the infrared heaters 54 through a line 60 as a blow gas, and the gas from a line 61 is supplied to the nozzles 55 provided among each of the infrared heaters 54 and, subsequently, is blown into the chambers. The gas blown from among each of the infrared heaters 54 is recovered through a line 62, and is supplied to a cooling nozzle 56 through a blower 58 and a heat exchanger 59.

The processing objects (not shown) are transferred by a conveyer (not shown in the figure) into the apparatus from right side in FIG. 8, preheated to a designated temperature by three pairs of the infrared heaters 54 at the preheating zone, further heated to a temperature for melting the solder by two pairs of the infrared heaters 54 at the main heating zone, and subsequently cooled by cooling nozzles 56 and cooling fans 57 at the cooling zone to finish the soldering process.

The above described prior art has the problems:

(i) Flow velocity of the hot gas which contributes to a convective heat transfer is restricted by a quantity of the hot gas supply because a blower for circulating the hot gas is not provided. On the other hand, it is necessary to minimize a quantity of gas supply (a quantity of consuming gas) because of expensiveness of the hot gas, and consequently, a radiation heat transfer by infrared becomes rather a main heat source than the convection heat transfer. Therefore, the reliability of the soldering decreases on account of local heating of the processing objects caused by each different colors and each different heat capacities of the members from others;

(ii) Flow directions of almost of the hot gas become horizontal when the hot gas is impinged upon the processing objects perpendicularly from above and beneath the processing objects. However, flow velocity of the hot gas in an inlet and outlet direction of the chambers varies depending upon the electronic members on the processing objects. Accordingly, although the hot gas flows stably in a condition without the processing objects, when the processing objects are placed in the chamber, the above described balanced condition without the processing objects is interrupted, and entering of an atmosphere at a room temperature into the chamber or releasing of the hot gas from the chamber occurs in some cases. Consequently, temperature of the hot gas fluctuates, and the reliability of the soldering is decreased. Furthermore, it becomes necessary to increase the hot gas supply and to strengthen the heating for keeping the desired temperature profile in the chamber, and accordingly, economy of the process decreases; and (iii) When the balance of the hot gas flow in the inlet and outlet direction is disturbed by placement of the processing objects, quantities of hot gas leakage among each of the preheating chamber, the reflow chamber, and the cooling chamber increase, and maintaining of the desired temperature profile in each of the chambers becomes difficult. Consequently, a necessary temperature profile for soldering the circuit substrate can not be maintained and the circuit substrate which can be soldered by the apparatus is restricted, and economy of the apparatus decreases.

A reflow soldering apparatus wherein soldering is performed by impinging a hot gas to a processing object by using a blower is disclosed in JP-A-63-278668 (1988).In accordance with the last mentioned prior art, blowers are installed at both an upper side and a lower side of a conveyer in a staggered manner, respectively, and a combination of the blowers installed in the above described manner causes formation of a circulating stream of the hot gas. However, the hot gas is impinged to the processing object after being blown out from the blowers and heated up on a desired temperature by a heater, and a turbulence of the circulating stream caused by the processing object which is transferred into the circulating stream by the conveyer is not considered sufficient, hence, the hot gas releases to a next chamber and there is a problem arises in that a preferable temperature profile for heating and cooling can not be obtained.

SUMMARY OF THE INVENTION

The object of the present invention is to solve the above described problems of the prior art and to provide an economical reflow soldering apparatus having small fluctuations with temperatures in the preheating chamber and the reflow chamber, and a high reliability in soldering by maintaining a desired temperature profile.

In order to realize the object described above, the reflow soldering apparatus related to the present invention is composed in such a manner that a processing object comprising a substrate which is applied with solder and is mounted with electronic members is transferred by a conveyer through a preheating chamber and a reflow chamber, the solder applied to surfaces of the substrate is melted by preheating and main heating with impinging a hot gas upon the processing object during passing through the chambers for soldering the electronic members to the substrate, wherein pairs of means for blowing out the hot gas in the preheating chamber and the reflow chamber are installed at each of above and beneath the conveyer, and one of a pair of the nozzles for blowing out the hot gas located at upstream side of the processing object transferring direction in the chamber is directed to any of an upward or a downward direction to the conveyer's moving plane and another nozzle located at downstream side in the same chamber is directed to an opposite direction to the direction of the nozzle located at the upstream side.

The means for blowing out the hot gas in the preheating chamber and the reflow chamber have a cross-flow blower and a divergent nozzle, respectively, and The direction of the hot gas blowing out from the divergent nozzle has two directional components, the one is any of the upstream or the downstream direction along the conveyer moving direction and the other is any of the upward or downward direction to the conveyer's moving plane.

The nozzles for blowing out the hot gas located at above the conveyer plane in the preheating chamber and the reflow chamber, respectively, are arranged each other in a back to back manner, and the nozzles located at beneath the conveyer plane are arranged each other in a face to face manner.

The hot gas, blown out from the nozzles arranged at above and beneath the conveyer, circulates without colliding each other in the preheating chamber and the reflow chamber, respectively. Consequently, the circulating hot gas operates as an air curtain at each of an inlet and an outlet of the preheating chamber and the reflow chamber, respectively, for preventing entrance of atmospheric air at room temperature into the chambers and from releasing the hot gas.

When a processing object is transferred into the preheating chamber or the reflow chamber by the conveyer, local recirculations of the hot gas partitioned by the processing object are generated at an upper space and a lower space of the conveyer in the chambers, respectively, by impinging the hot gas upon the processing objects, and both the entrance of atmospheric air and the releasing of the hot gas are prevented.

Due to the above described function of the prevention the entrance of atmospheric air and releasing of the hot gas, the temperature fluctuations with the hot gas in the preheating chamber and the reflow chamber decrease, the desired temperature profile can be maintained, and accordingly, reliability of the soldering can be improved. Furthermore, maintaining of the hot gas temperature can be facilitated, man-power in the heating process can be reduced, types of circuit substrates which can be processed by the apparatus increase, and accordingly, economy of the apparatus is improved by increased degree of the utilization.

DETAILED DESCRIPTION OF THE EMBODIMENTS

Figure 1:
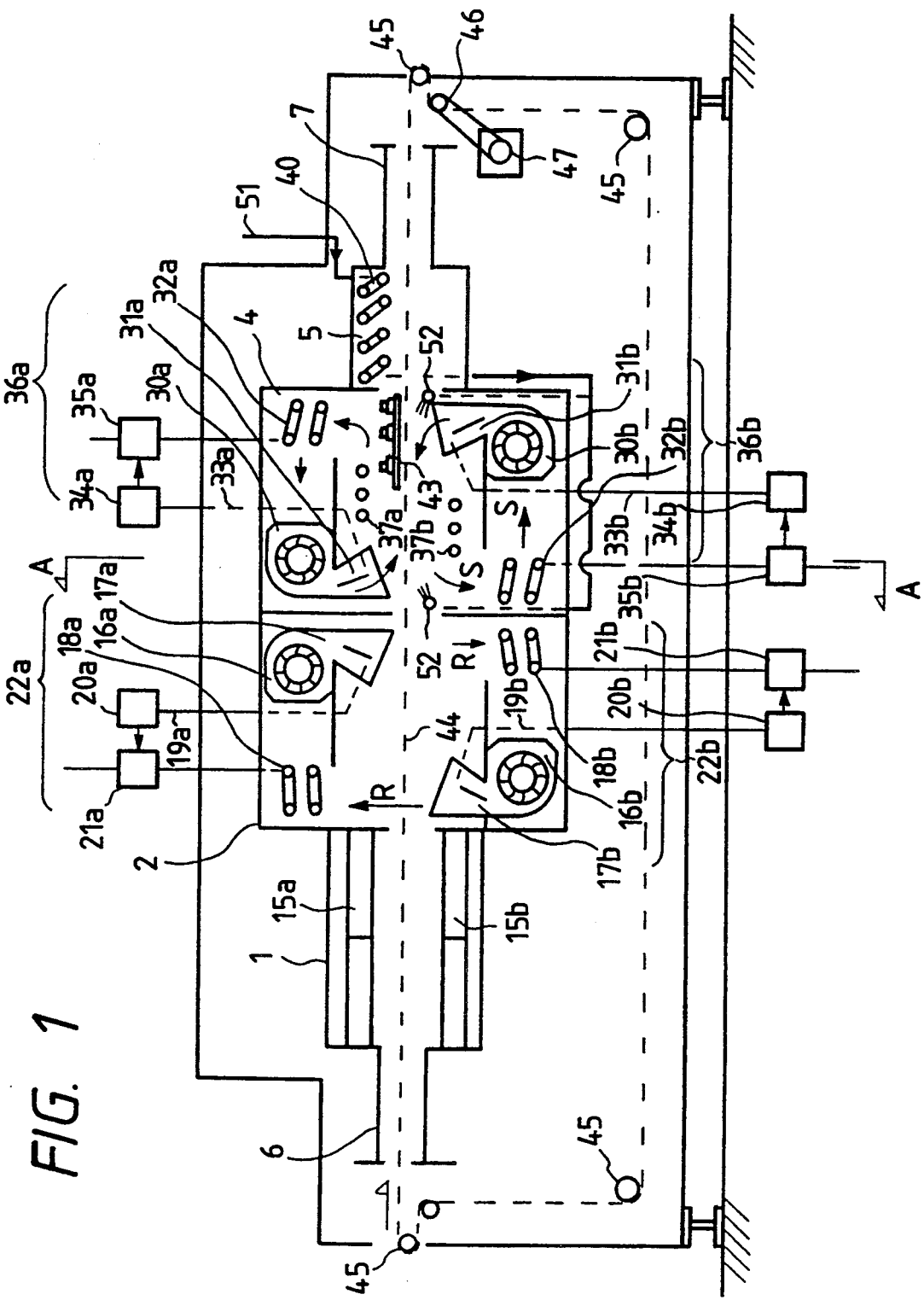
FIG. 1 is a schematic vertical cross section illustrating a composition of a reflow soldering apparatus relating to an embodiment of the present invention.

Hereinafter, a suffix "a" to a reference numeral for a member in each of drawings means the member located above the conveyer, and "b" means the member located beneath the conveyer. For example, 15a in a first zone of the preheating chamber 1 indicates an infrared heater located above the conveyer, 15b indicates an infrared heater located beneath the conveyer, and 15a and 15b are called generically the infrared heater 15 in this explanation.

The reflow soldering apparatus shown in FIG. 1 is composed of the first zone of the preheating chamber 1, the second zone of the preheating chamber 2, the reflow chamber 4, the cooling chamber 5, the sealing chamber at inlet side 6, and the sealing chamber at outlet side 7.

The first zone of the preheating chamber 1 is equipped with the infrared heater 15. The second zone of the preheating chamber 2 and the reflow chamber 4 are equipped respectively with the means for circulating the hot gases 22, 36, which relates to a means for blowing the hot gas, comprising each of the cross-flow blowers 16, 30, the divergent nozzles 17, 31 for blowing out the hot gas, the heaters 18, 32, the temperature sensors 19, 33, the temperature controllers, 20, 34, and the power regulators 21, 35.

Furthermore, the reflow chamber 4 is equipped with the infrared heater 37. The cooling chamber 5 is equipped with the cooling coil 40 wherein a low temperature gas flows inside. The cooling coil 40 is connected to the gas supply nozzle 52 provided in the reflow chamber 4.

The divergent nozzles 17, 31 are directed in an oblique direction to the processing object 43 on the conveyer 44 as shown in FIG. 1, and a flow passage of the nozzle is divided into two portions in a divergent angle direction. Regarding the cross-flow blowers 16, 30, the cross-flow blowers 16a and 30a located above the conveyer 44 are arranged in a back to back manner, and the cross-flow blowers 16b and 30b located beneath the conveyer 44 are arranged in a face to face manner.

Figure 2:
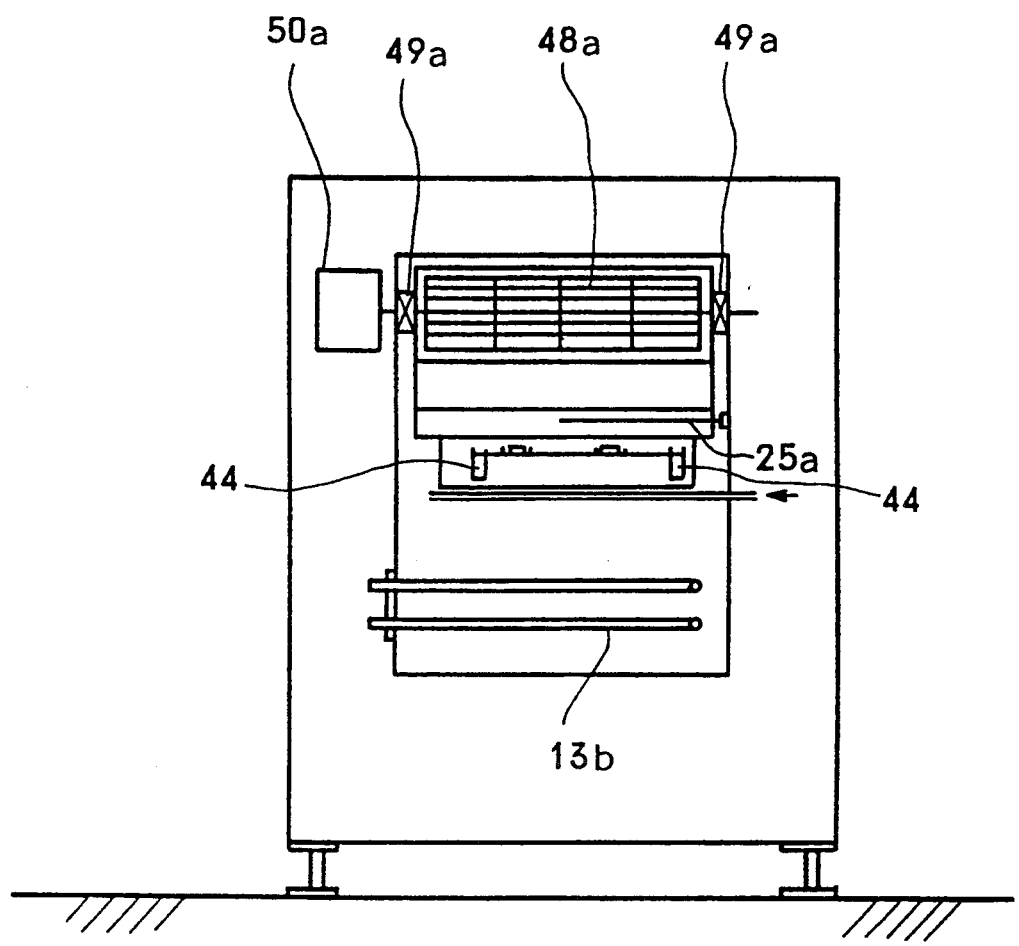
FIG. 2 is a cross sectional view taken on line A—A of FIG. 1.

The impeller 48 (48a is shown in FIG. 2) of the respective cross-flow blowers 16, 30 is supported by the bearing 49 (49a) as shown in FIG. 2, and is driven by the motor 50 (50a). A rotary shaft of each cross-flow blower extends in a direction along a width of the apparatus which is in a right angle to the transferring direction of the processing object by the conveyer 44 as shown in FIG. 2, and the impeller 48 (48a) has a width approximately equivalent to a width of the conveyer 44. Each of gas inlets of the cross-flow blowers is directed to the heaters 18, 32, and the gas pressurized by the impeller 48 is blown out from the divergent nozzles 17, 31.

The endless conveyer 44, which transfers the processing object 43 through the first zone of the preheating chamber 1, the second zone of the preheating chamber 2, the reflow chamber 4, and the cooling chamber 5, is installed, and the conveyer drive motor 47 operates the drive sprocket 46 so that the conveyer 44 moves in order to transfer the processing object 43 from left to right in the drawing. The numeral 45 indicates an idler for the conveyer 44.

Next, operation of the apparatus is explained hereinafter when, for an example, that nitrogen is used as the gas supplied from the gas supply nozzle 52 through the cooling coil 40.

In the first zone of the preheating chamber 1, the processing object 43 is heated to a high temperature by radiation from the infrared heaters 15a, 15b, which are provided above and beneath the conveyer 44. Nitrogen gas in the second zone of the preheating chamber 2 is heated to an adequate temperature for preheating by the heaters 18a, 18b, the heated nitrogen gas is pressurized by the impeller in the cross-flow blowers, 16a, 16b and is blown out through the divergent nozzles 17a, 17b so as to impinge upon the processing object 43. Temperature of the nitrogen decreases by giving heat to the processing object 43, and subsequently, the nitrogen is heated to a high temperature again by the heaters 18a, 18b and the nitrogen repeats the circulation driven by the cross-flow blowers 16a, 16b again.

Heating method for the processing object 43 by nitrogen gas in the reflow chamber 4 is almost same as the heating method of the second zone in the preheating chamber 2. Furthermore, the infrared heaters 37a, 37b are provided respectively at upper portion and lower portion of the reflow chamber in order to heat the nitrogen gas to an adequate temperature for soldering, and the processing object 43 is heated to a higher temperature than the temperature in the second zone in the preheating chamber 2.

Nitrogen gas is supplied to the reflow chamber 4 through the gas piping 51, the cooling coil 40, and the gas supply nozzle 52 which is provided at an inlet and an outlet of the reflow chamber 4, respectively, and an internal atmosphere in the reflow chamber 4 is maintained rich in nitrogen. The nitrogen gas in the reflow chamber 4 flows in both a direction to the inlet and a direction to the outlet of the chamber, and nitrogen concentration in internal atmospheres of the each chambers other than the reflow chamber 4 is maintained at values depending on leakage of the nitrogen gas from the reflow chamber.

Although an example wherein the nitrogen gas supply nozzle 52 is provided in the reflow chamber 4 is explained in the first embodiment shown in FIG. 1, the nozzle can be provided in either of the preheating chamber or the cooling chamber depending on its object. The solder applied on the processing object 43 melts in the reflow chamber 4, subsequently, the soldering under a desired temperature is finished by cooling by the nitrogen gas which is cooled with the cooling coil 40 in the cooling chamber 5.

Temperature of the processing object can be increased homogeneously over its width because the hot gas circulates uniformly in a width direction by the cross-flow blowers 16, 30. Furthermore, the hot gas flows with a uniform velocity in its width and in the transferring direction of the processing object 43 by the cross-flow blowers 16, 30 without using a straightening vane or a resistance, and consequently, a load to the blower decreases, a power and noises of the blower decrease, and an economy of process can be improved.

The infrared heaters 15, 37 can heat the upper portion and the lower portion of the chambers to different temperatures each other, and accordingly, the heaters are preferable for preventing thermal deformation of the processing object 43, and for providing a temperature difference to the circuit substrate and the electronic members of the processing object 43.

Especially, the cross-flow blowers 16, 30, for circulating the hot gas 22, 36, are arranged in a back to back manner in the upper portion and in a face to face manner in the lower portion of the chambers as described above, and each of the cross-flow blowers 16, 30 has the outlet for the gas. Therefore, when the processing object 43 does not exist in the second zone of the preheating chamber 2 or the reflow chamber 4, an air curtain effect by the circulating gas flow in an up and down direction (a recirculation indicated by an arrow R in FIG. 1) is generated at each of the inlet and the outlet of the chambers. When the processing object 43 exists in the second zone of the preheating chamber 2 or the reflow chamber 4, counter current circulating gas flows in the transferring direction are generated in the upper portion and the lower portion of the conveyer 44 (a recirculation indicated by an arrow S in FIG. 1), respectively. Accordingly, the entrance of atmospheric air at a room temperature and releasing of the hot gas are prevented, fluctuation of the nitrogen gas flow by the processing object 43 decreases, fluctuation of the temperature in the chambers decreases, a desired temperature profile can be obtained, and a certain soldering can be achieved with a saved power.

The hot nitrogen gas blown out from the divergent nozzles 17, 31, flows obliquely to the transferring direction of the processing object 43, and consequently, the gas stream has a horizontal component (an upstream direction or a downstream side) in addition to the component in the up and down direction. Accordingly, the hot gas flow can impinge upon shadow portions of the electronic members in addition to generate the air curtain, and consequently, an entire portion of the processing object can obtain a sufficient high temperature. Especially, when the soldering must be performed at a lower surface of an IC package, the solder certainly melts with the apparatus of the present invention. Consequently, the soldering of various substrates such as a high density packaging substrates including a multipins large size package becomes possible.

The hot gas recirculations (R, S) in the second zone of the preheating chamber 2 and the reflow chamber 4 are generated by an arrangement of the divergent nozzles 17a, 17b, 31a, 31b at the upper and the lower portions in the chambers 2, 4 and the cross-flow blowers 16a, 16b, 30a, 30b in a diagonal relationship at each portions of the above and the beneath the conveyer 44. Therefore, the locations of the above described members at the upper portion and the lower portion can be modified to an arrangement in a staggered manner from the upstream side to the downstream side of the conveyer moving direction in addition to the back to back manner at the upper portion and the face to face manner at the lower portion as shown in FIG. 1. And, an arrangement in the face to face manner at the upper portion and the back to back manner at the lower portion may be adopted.

Furthermore, other means for heating such as an infrared heater etc. can be used for heating a part of the preheating chamber as shown in FIG. 1.

Figure 3:
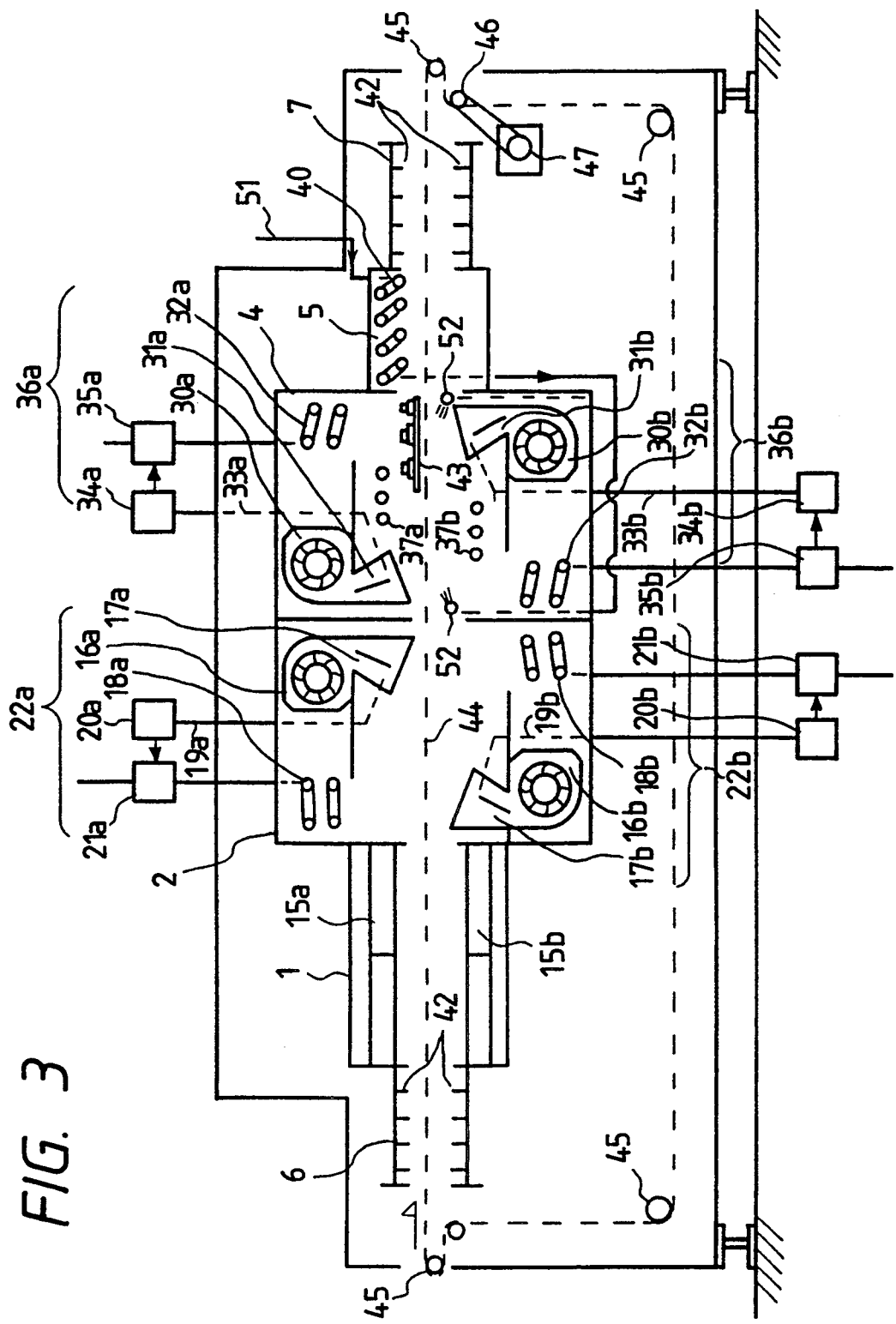
FIG. 3 is a schematic vertical cross section illustrating a composition of a reflow soldering apparatus relating to another embodiment of the present invention.

A difference between the embodiment shown in FIG. 3 from the embodiment shown in FIG. 1 is in providing a labyrinth 42 at each of an inlet side and an outlet side of sealing chambers 6, 7, respectively.

In accordance with the present embodiment, leakage of the hot gas from the inlet and the outlet of the sealing chambers can be decreased further by a labyrinth effect, and the economy of the apparatus can be improved.

Figure 4:
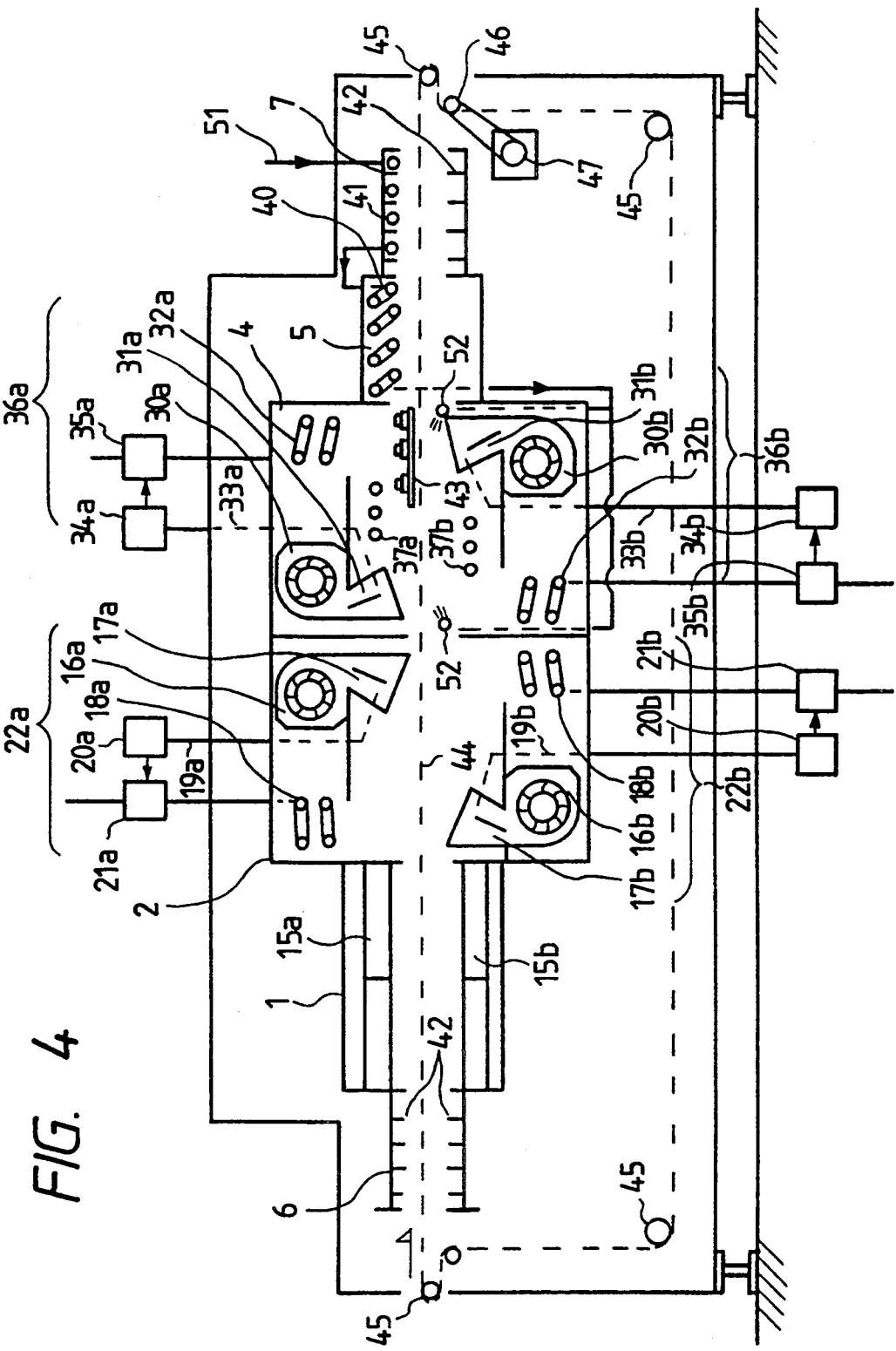
FIG. 4 is a schematic vertical cross section illustrating a composition of a reflow soldering apparatus relating to a further other embodiment of the present invention.

A difference between the embodiment of FIG. 4 from the embodiments of FIG. 1 and 3 resides in providing a cooling coil 41 between the labyrinth 42 at an outlet side of the sealing chamber 7.

In accordance with the embodiment of FIG. 4, the soldering reliability of the processing object 43 can be improved by cooling the nitrogen gas with the cooling coil 42 at the outlet side in the sealing chamber 7. Furthermore, the nitrogen gas is heated during its flowing through the cooling coils 40, 41, and accordingly, temperature drop in the reflow chamber 4 becomes small even if the nitrogen gas blows out from the gas supply nozzle 52.

Figure 5:
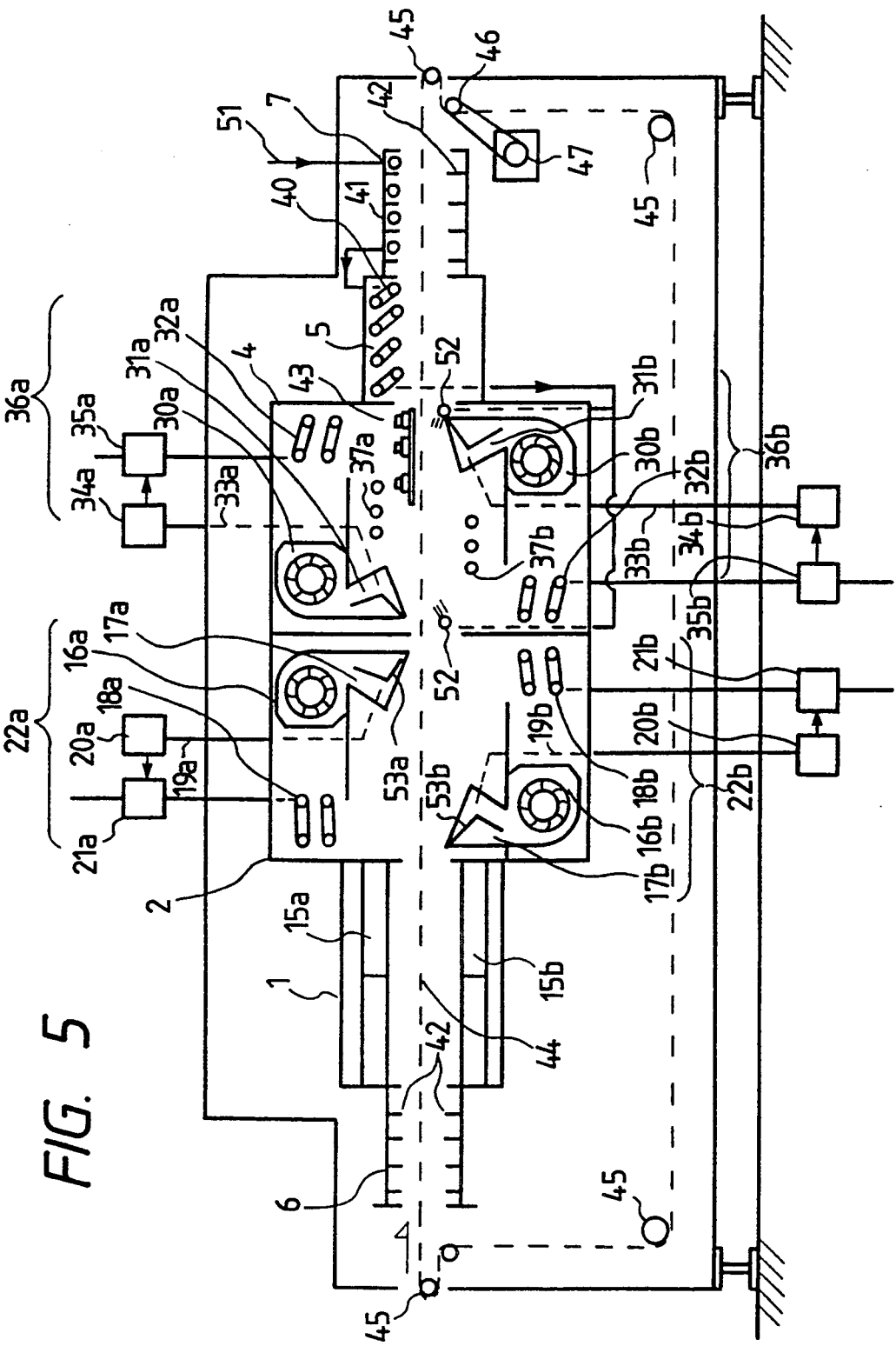
FIG. 5 is a schematic vertical cross section illustrating a composition of a reflow soldering apparatus relating to a further other embodiment of the present invention.

The embodiment shown in FIG. 5 is a case wherein hot gas blowing out passages of the divergent nozzles 17, 31 are divided into two portions in the transferring direction of the processing object and either outlet of the two portions is closed by a lid 53.

In accordance with the embodiment FIG. 5, directions of blowing nitrogen gases from the divergent nozzles 17, 31 can be changed without deteriorating characteristics of the cross-flow blowers 16, 30, and consequently, concentration of the nitrogen gas increases, a quantity of the nitrogen gas for impinging upon the processing object 43 decreases, and economy of the apparatus can be improved.

Furthermore, the lid 53 of the divergent nozzle 53 can be applied to all embodiments of the present invention. And, dividing ratio of the hot gas blowing out passage can be selectively decided.

Figure 6:
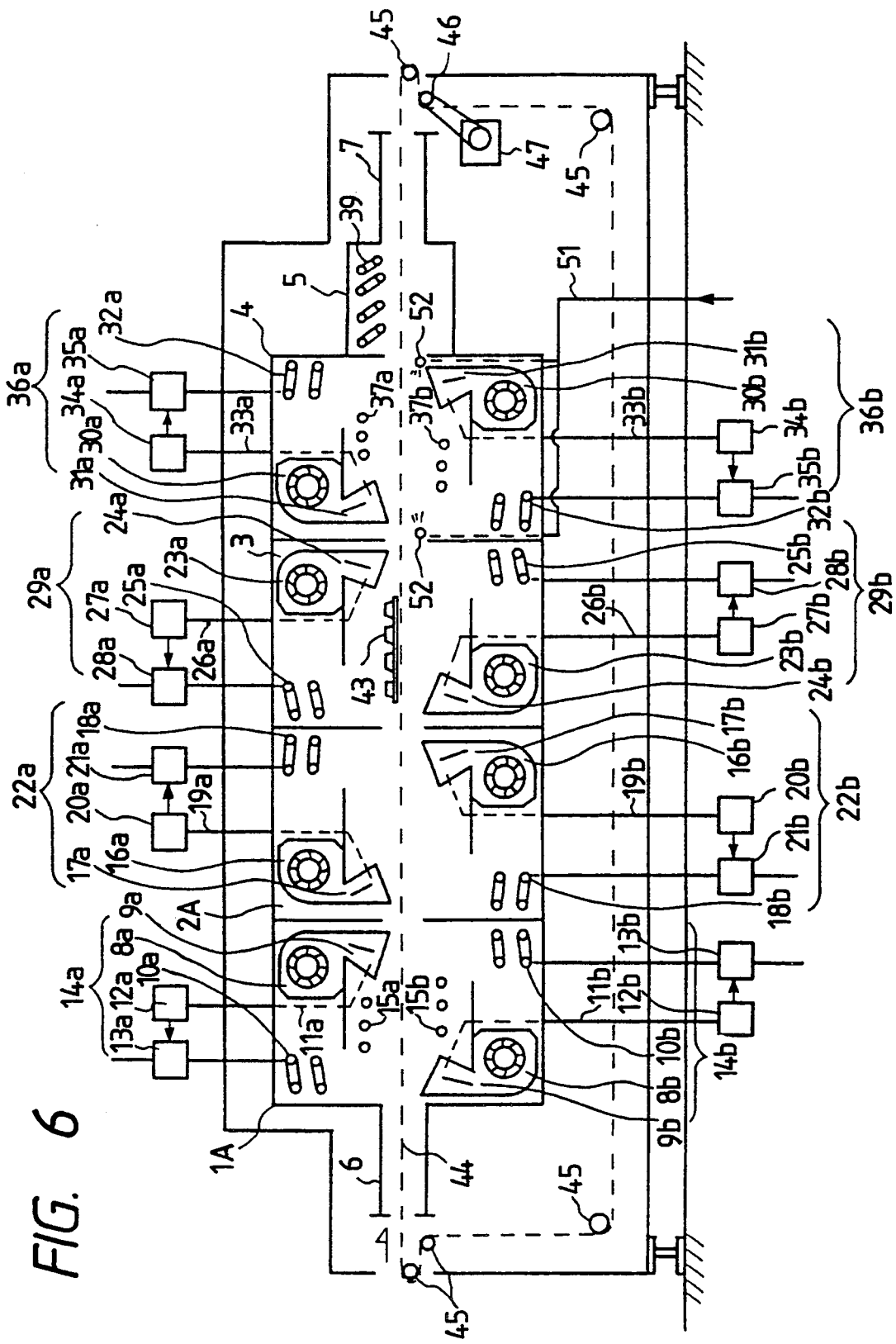
FIG. 6 is a schematic vertical cross section illustrating a composition of a reflow soldering apparatus relating to a further other embodiment of the present invention.

A difference between the embodiment of FIG. 6 from the embodiment of FIG. 1 resides in adding a third zone of the preheating chamber 3, providing a means for circulating the hot gas 29 therein, and providing the means for circulating the hot gas 14 in the first zone of the preheating chamber 1A.

Each of the means for circulating the hot gas 14, 29, comprises cross-flow blowers 8, 23, divergent nozzles 9, 24, heaters 10, 25, temperature sensors 11, 26, temperature controllers 12, 27, and power regulators 13, 28, respectively.

In the reflow soldering apparatus shown in FIG. 6, each of the first, the second, and the third zones of the preheating chamber 1A, 2A, 3 and the reflow chamber 4 comprises the means for circulating the hot gas 14, 22, 29, 29, respectively.

And, in the first and the second zones of the preheating chamber 1A, 2A, the cross-flow blowers 8a, 16a are arranged in a back to back manner above the conveyer 44, and the cross-flow blowers 8b, 16b are arranged in a face to face manner beneath the conveyer 44, and, in the third zone of the preheating chamber 3 and the reflow chamber 4, the once-through blowers 23a, 30a are arranged in the back to back manner above the conveyer 44, and the cross-flow blowers 23b, 30b, are arranged in the face to face manner beneath the conveyer 44.

Furthermore, in the first zone of the preheating chamber 1A and the reflow chamber 4 wherein temperature increasing ratio is larger than that of other zones or chambers, the infrared heaters 15a, 37a are located above the conveyer 44 and the infrared heaters 15b, 37b are located beneath the conveyer 44.

The present embodiment is preferable for applying to a case when the processing object has a large heat capacity.

Figure 7:
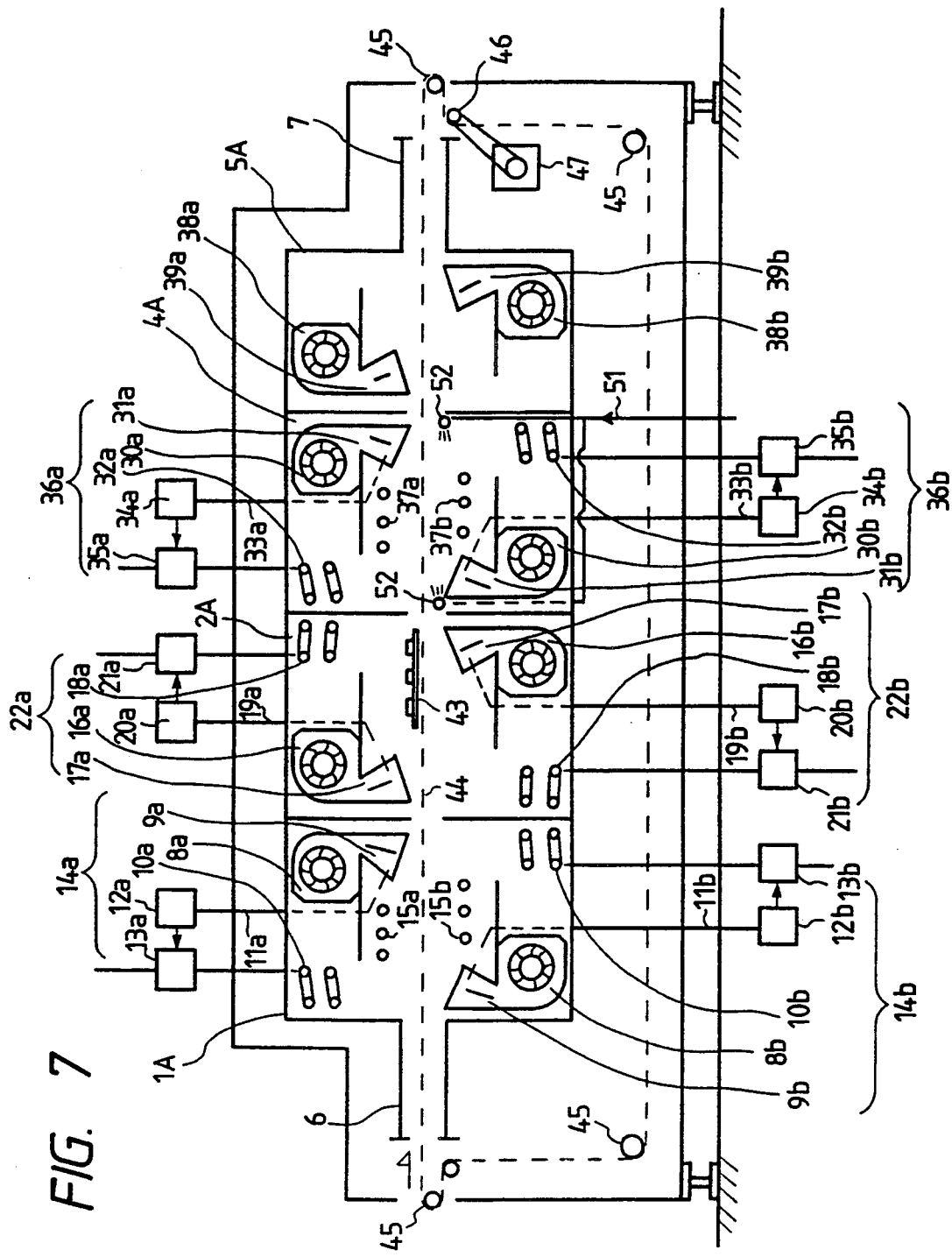
FIG. 7 is a schematic vertical cross section illustrating a composition of a reflow soldering apparatus relating to a further other embodiment of the present invention.
Figure 8:
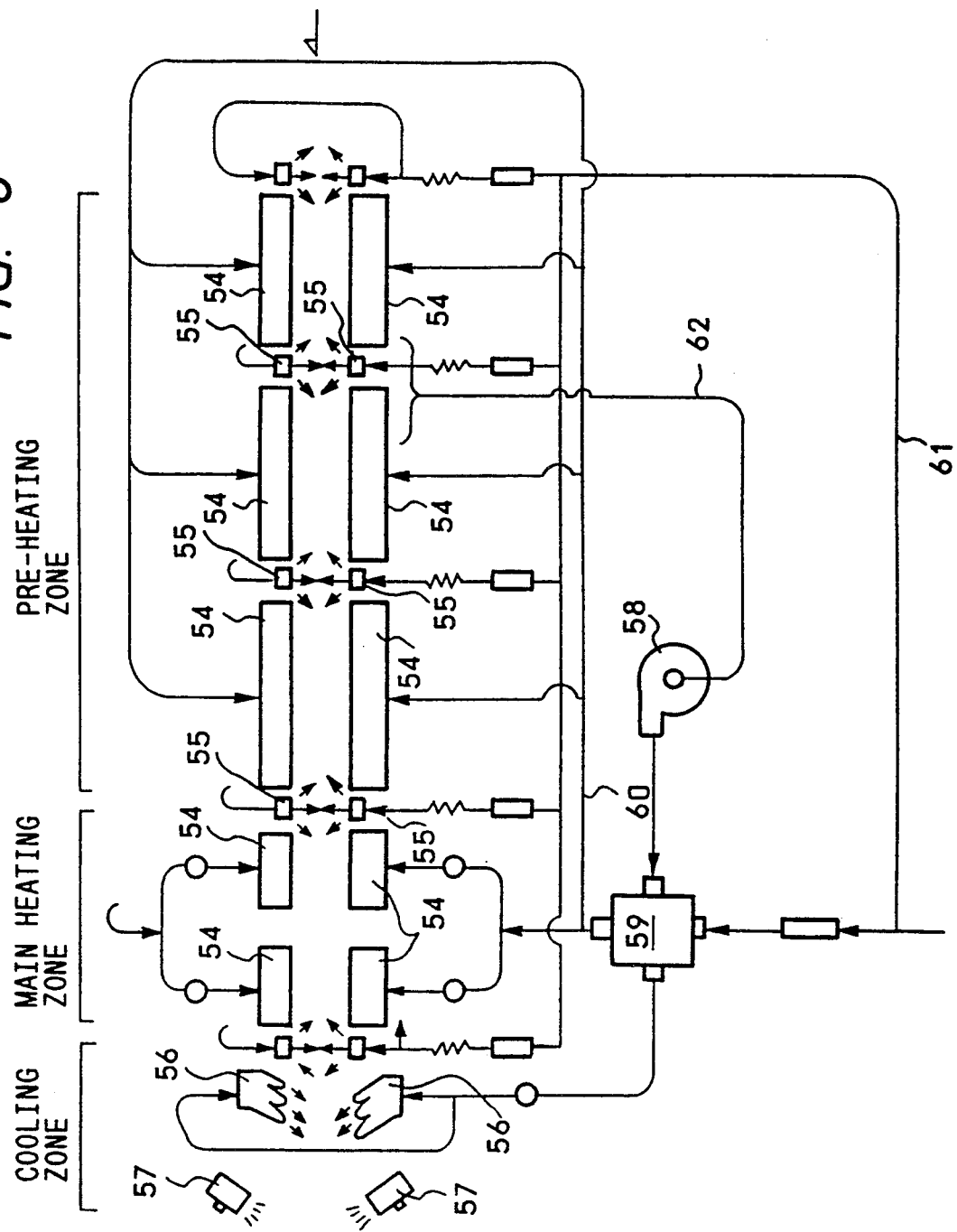
FIG. 8 is a schematic vertical cross section illustrating a composition of a reflow soldering apparatus relating to a prior art.

In the reflow soldering apparatus of FIG. 7, each of the first and the second zones of the preheating chamber 1A, 2A and the reflow chamber 4 comprises the means for circulating the hot gas 14, 22, 36, respectively, and the cross-flow blower 38 having the divergent nozzle 39 is arranged in the cooling chamber 5A. In the first and the second zones of the preheating chamber 1A, 2A, the cross-flow blowers 8a, 16a are arranged in a back to back manner above the conveyer 44, and the cross-flow blowers 8b, 16b are arranged in a face to face manner beneath the conveyer 44, and in the reflow chamber 4A and the cooling chamber 5A, the cross-flow blowers 30a, 38a are arranged in the back to back manner above the conveyer 44, and the cross-flow blowers 30b, 38b are arranged in the face to face manner beneath the conveyer 44.

The embodiment of FIG. 7 has the same advantages as that of the of FIG. 6.

In accordance with the present invention, the economical reflow soldering apparatus wherein the temperature fluctuation in the preheat chamber and the reflow chamber is small, and a reliability of the soldering operation is improved by maintaining a desired temperature profile.

What is claimed is:

1. A reflow soldering apparatus comprising:
a conveyor for transferring a processing object comprising a circuit substrate which is applied with solder and is mounted with electronic members to a preheating chamber and a reflow chamber;
each of said preheating chamber and said reflow chamber having means for heating said circuit substrate with said electronic members for melting said solder by impinging a hot gas upon said processing object, each of said preheating chamber and said reflow chamber comprising upper blower means located above said conveyor, near one of an upstream and a downstream side of a transferring direction of the conveyor, in the chamber, and blowing obliquely toward said conveyor, and lower blower means located below said conveyor, near the other side of the chamber, and blowing obliquely toward said conveyor for circulating said hot gas in the respective chamber; and means for heating said hot gas disposed in a circulating area of the hot gas.

2. A reflow soldering apparatus as claimed in claim 1, wherein each of said upper and lower blower means in said preheating chamber and in said reflow chamber comprises a cross-flow blower and a divergent nozzle, wherein the oblique blowing from each of said upper and lower blowers is supplied from the respective divergent nozzles.

3. A reflow soldering apparatus as claimed in claim 2, wherein said nozzles of said upper blower means in said preheating chamber and in said reflow chamber are arranged in a back to back manner to each other, and the respective nozzles of said lower blower means in said preheating chamber and in said reflow chamber are arranged in a face to face manner with respect to each other.

4. A reflow soldering apparatus as claimed in claim 2, wherein a rotary shaft of said cross-flow blower extends in a right angle direction to a transferring direction of said processing object.

5. A reflow soldering apparatus as claimed in claim 2, wherein the respective nozzles of said upper and lower blower means in said preheating chamber and in said reflow chamber are arranged in a staggered manner in a transfer direction of the processing object.

6. A reflow soldering apparatus as claimed in claim 2, wherein each of said nozzles of said upper and lower blower means is provided at one outlet of divided hot gas flowing passages.

7. A reflow soldering apparatus comprising:

a conveyor for transferring a processing object comprising a circuit substrate which is applied with solder and is mounted with electronic members to a plurality of preheating chambers and a reflow chamber;

each of at least one of said plurality of preheating chamber and said reflow chamber having means for heating said circuit substrate with said electronic members for melting said solder by impinging a hot gas upon said processing object, each of said at least one of said plurality of preheating chambers and said reflow chamber comprising upper blower means located above said conveyor, near one of an upstream and a downstream side of a transferring direction of the conveyor, in the chamber, and blowing obliquely toward said conveyor, and lower blower means located below said conveyor, near the other side of the chamber, and blowing obliquely toward said conveyor for circulating said hot gas in said chamber; and means for heating said hot gas located in a circulating path of the hot gas.

8. A reflow soldering apparatus as claimed in claim 7, wherein at least some of the chambers are furnished with labyrinth for decreasing a leakage of the hot gas, with the labyrinth being provided at an inlet and outlet of the respective chambers.

9. A reflow soldering apparatus as claimed in claim 8, wherein a cooling coil is provided between said labyrinth provided at the outlet of the chamber.

10. A reflow soldering apparatus as claimed in claim 9, wherein at least some of the chambers are provided with labyrinths for decreasing leakage of the hot gas, said labyrinth being provided at an inlet and an outlet and of the respective chambers.

11. A reflow soldering apparatus as claimed in claim 10, wherein a cooling coil is provided between said labyrinth provided at the outlet of the respective chambers.

* * * * *